United States Patent
Huang et al.

(10) Patent No.: US 9,257,876 B2
(45) Date of Patent: Feb. 9, 2016

(54) MOTOR INTEGRATED TO ELECTRONIC DEVICE

(71) Applicant: Metal Industries Research & Development Centre, Kaohsiung (TW)

(72) Inventors: Guang-Miao Huang, Kaohsiung (TW); Guo-Jhih Yan, Kaohsiung (TW); Hsin-Te Wang, Taipei County (TW); Jing-Hui Wang, Taipei County (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 302 days.

(21) Appl. No.: 13/866,215

(22) Filed: Apr. 19, 2013

(65) Prior Publication Data

US 2013/0234566 A1 Sep. 12, 2013

Related U.S. Application Data

(63) Continuation-in-part of application No. 12/617,195, filed on Nov. 12, 2009, now abandoned.

(30) Foreign Application Priority Data

Nov. 14, 2008 (TW) ................................ 97144117 A

(51) Int. Cl.
*H02K 3/26* (2006.01)
*H02K 11/00* (2006.01)
*H02K 7/14* (2006.01)

(52) U.S. Cl.
CPC .. *H02K 3/26* (2013.01); *H02K 7/14* (2013.01); *H02K 11/0094* (2013.01); *H02K 11/001* (2013.01)

(58) Field of Classification Search
CPC ..... H02K 21/24; H02K 7/14; H02K 11/0073; H02K 5/225; H02K 29/08; H02K 3/26
USPC ............................... 310/67 R, 68 R, 208, 268
See application file for complete search history.

(56) References Cited

U.S. PATENT DOCUMENTS

| 4,961,017 A * | 10/1990 | Kakinoki ............... H02K 29/08 310/268 |
| 5,216,310 A * | 6/1993 | Taghezout .................... 310/268 |
| 5,739,975 A * | 4/1998 | Parks et al. ..................... 360/81 |
| 5,760,521 A * | 6/1998 | Ushiro ................... H02K 7/116 310/156.32 |
| 5,793,137 A * | 8/1998 | Smith ........................... 310/114 |
| 7,132,770 B2 * | 11/2006 | Yamaguchi et al. .......... 310/268 |
| 7,800,274 B2 * | 9/2010 | Yamaguchi ............ H02K 1/182 310/254.1 |
| 2004/0245866 A1 * | 12/2004 | Lopatinsky et al. ............ 310/64 |

(Continued)

*Primary Examiner* — Dang Le
(74) *Attorney, Agent, or Firm* — Juan Carlos A. Marquez; Bacon & Thomas PLLC

(57) ABSTRACT

An electronic device includes a first structural part, a first electronic substrate correspondingly mounted on the first structural part, and a motor. The motor includes a second structural part and a second electronic substrate, a base directly formed on the second structural part, a rotor having at least one load, and a stator. The first and second structural parts are integrally made. The first and second structural parts are combined to a single electronic structural part. The stator has a plurality of winding coils and a driving circuit directly shaped on the second electronic substrate respectively for driving the rotor. The first and second electronic substrates are integrally made. The first and second electronic substrates are combined to a single electronic substrate. Alternatively, the driving circuit is directly shaped in the second electronic substrate.

14 Claims, 10 Drawing Sheets

(56) References Cited

U.S. PATENT DOCUMENTS

| | | | |
|---|---|---|---|
| 2005/0285470 A1* | 12/2005 | Itoh et al. | 310/208 |
| 2006/0022537 A1* | 2/2006 | Yamaguchi et al. | 310/81 |
| 2006/0196639 A1* | 9/2006 | Yang et al. | 165/83 |
| 2010/0123372 A1* | 5/2010 | Huang | H02K 7/14 310/67 R |

* cited by examiner

MOTOR INTEGRATED TO ELECTRONIC DEVICE

CROSS-REFERENCE TO RELATED APPLICATIONS

This application is a continuation-in-part of U.S. patent application Ser. No. 12/617,195, filed on Nov. 12, 2009, which is hereby incorporated by reference in its entirety.

BACKGROUND OF THE INVENTION

1. Field of the Invention

The present invention relates to a motor integrated to an electronic device, and more particularly to a motor, in which rotating parts and fixed parts of the motor are directly integrated to a structural part and an electronic substrate of an electronic device.

2. Related Art

Usually, in an electronic device, if a motor (or an electric motor) needs to be placed as a source of motive power of a heat sink fan or a source of vibration, the complete motor product is placed in the electronic product. In addition, in order to save the space, the circuit board needs to be manufactured to an appropriate shape, so as to match the shape of the motor product (for example, in U.S. Pat. No. 7,248,473), or the motor is independently designed and manufactured. Moreover, a mounting portion needs to be considered after the motor is already manufactured, and then the motor is connected to the circuit of the electronic device on which the motor is mounted (for example, in U.S. Pat. No. 5,943,214). Further, a miniature fan motor is directly mounted on a printed circuit board (PCB) (for example, in U.S. Pat. No. 5,478,221), in which a complete motor product is directly mounted on the circuit board through a bearing base in an axial direction or a radial direction. The adopted motor product is still independently designed and manufactured, such that it is rather difficult to thin the motor in space, and the cost is increased due to the repeated use of the resources.

SUMMARY OF THE INVENTION

The present invention is directed to a motor integrated to a structural part and an electronic substrate of an electronic device, in which rotating parts of the motor are directly combined with the structural part, and fixed parts of the motor are formed on the electronic substrate.

In one embodiment, an electronic device according to the present invention includes a first structural part, a first electronic substrate correspondingly mounted on the first structural part, and a motor. The motor includes a second structural part and a second electronic substrate, a base directly formed on the second structural part, a rotor having at least one load, and a stator. The first and second structural parts are integrally made, whereby the first and second structural parts are combined to a single electronic structural part. The stator has a plurality of winding coils and a driving circuit directly shaped on the second electronic substrate respectively for driving the rotor. The first and second electronic substrates are integrally made, whereby the first and second electronic substrates are combined to a single electronic substrate.

In one embodiment, the driving circuit further includes a sensing unit.

In one embodiment, the sensing unit is at least one sensing circuit or at least one Hall element.

In one embodiment, the rotor includes a permanent magnet and a yoke disposed corresponding to the permanent magnet.

In one embodiment, the base includes a bearing seat formed on the structural part, a shaft and a bearing disposed on the bearing seat. An inner diameter of the bearing is connected to the shaft, and an outer diameter of the bearing is connected to the rotor.

In one embodiment, the stator is located between the base and the rotor, and the electronic substrate has a through hole allowing the base to assemble with the rotor through a bearing.

In one embodiment, the electronic device is a display card.

In one embodiment, the load of the rotor is a fan blade adapted to be a source of heat dissipation of the electronic device, or the load of the rotor is an eccentric block adapted to be a source of vibration of the electronic device.

In one embodiment, the electronic substrate is a printed circuit board (PCB).

In one embodiment, the electronic substrate is a printed circuit board assembly (PCBA).

In one embodiment, the structural part is a case of the electronic device.

In one embodiment, the electronic device is a cell phone, a notebook computer, or a mini notebook computer.

In another embodiment, an electronic device according to the present invention includes a first structural part, a first electronic substrate correspondingly mounted on the first structural part, and a motor. The motor includes a second structural part and a second electronic substrate, a base directly formed on the second structural part, a rotor having at least one load, and a stator. The first and second structural parts are integrally made, whereby the first and second structural parts are combined to a single electronic structural part. The stator has a plurality of winding coils and a driving circuit directly shaped in the second electronic substrate respectively for driving the rotor. The first and second electronic substrates are integrally made, whereby the first and second electronic substrates are combined to a single electronic substrate.

In one embodiment, the electronic device further includes a display screen, and the first structural part is adapted to support the display screen.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Preferred embodiments of the present invention are described in detail below with accompanying drawings.

Figure 1:
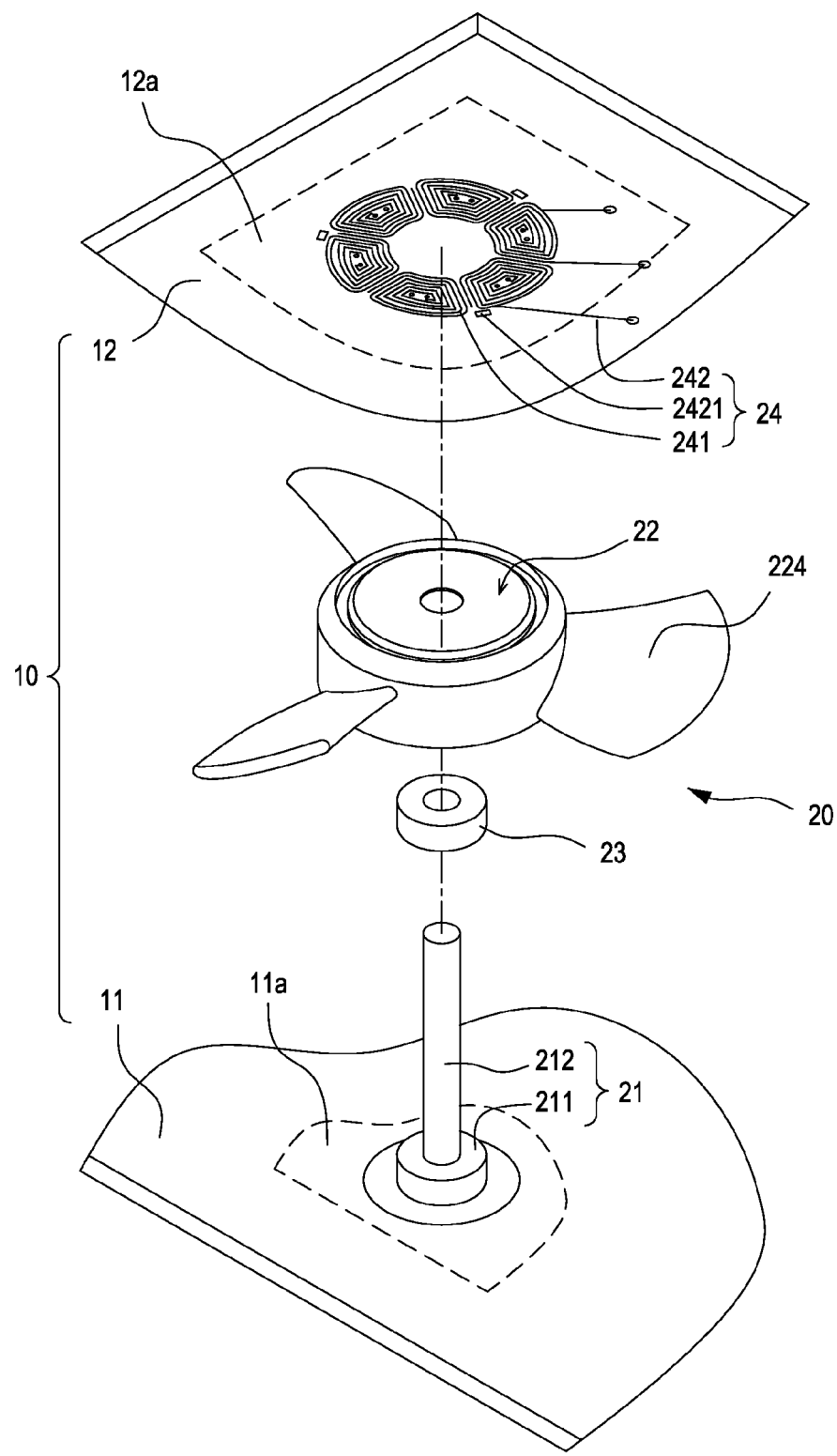
FIG. 1 is a three-dimensional (3D) exploded view of a motor according to one embodiment of the present invention, in which a rotor is located between a base and a stator.
Figure 2:
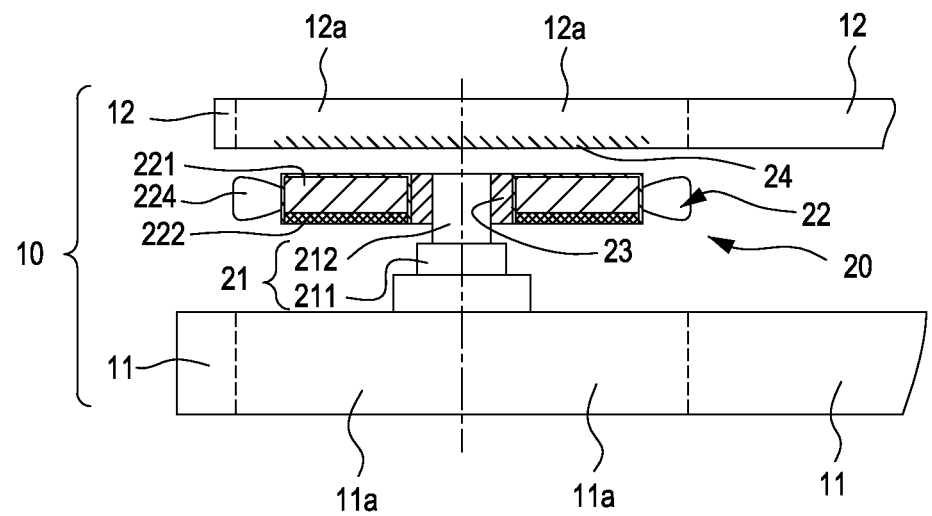
FIG. 2 is a combined cross-sectional view of FIG. 1.

FIG. 1 is a three-dimensional (3D) exploded view of a motor according to one embodiment of the present invention, in which a rotor is located between a base and a stator, and FIG. 2 is a combined cross-sectional view of FIG. 1. Referring to FIGS. 1 and 2, a motor 20 integrated to an electronic device 10 according to an embodiment of the present invention is integrated to a first structural part 11 of the electronic device 10 and a first electronic substrate 12 correspondingly mounted on the first structural part 11. The motor 20 includes a second structural part 11a and a second electronic substrate 12a. The motor 20 further includes a base 21 directly shaped on the second structural part 11a, a rotor 22 having at least one load, a bearing 23 disposed between and connected to the rotor 22 and the base 21, and making the rotor 22 to rotate relative to the base 21, and a stator 24 respectively shaped on the second electronic substrate 12a, in which the stator 24 has a plurality of winding coils 241 and a driving circuit 242, for driving the rotor 22.

The first and second structural parts 11, 11a are integrally made, e.g., the first and second structural parts 11, 11a are integrally made by an injection molding process, whereby the first and second structural parts 11, 11a are combined to a single electronic structural part. Also, the first and second electronic substrates 12, 12a are integrally made, e.g., the first and second electronic substrates 12, 12a are integrally made by photolithography and etching processes, whereby the first and second electronic substrates 12, 12a are combined to a single electronic substrate.

Usually, the electronic device 10 includes the first structural part 11 and an electronic part, the first structural part 11 is, for example, a case, a heat sink, a press button, and the like, and the electronic part is the first electronic substrates 12 such as a print circuit board (PCB) and a print circuit board assembly (PCBA) having electronic components mounted thereon. In the present invention, rotating parts of the motor 20, such as the base 21, the bearing 23, and the rotor 22 (and a fan blade, an eccentric block, or other loads), are directly integrated to the first structural part 11, and the winding coils 241 and the driving circuit 242 of the stator 24 of the motor 20 are directly integrated to the first electronic substrate 12, and manufactured in the process of manufacturing the first electronic substrate 12. The driving circuit 242 according to one embodiment may not have a sensor, or may further include a sensing unit 2421, in which the sensing unit 2421 may be a sensing circuit shaped on the second electronic substrate 12a or a Hall element. The rotor 22 includes a permanent magnet 221 and a yoke 222 disposed corresponding to the permanent magnet 221. The base 21 may have two different types, for example, the base 21 includes a bearing seat 211 formed on the second structural part 11a and a shaft 212 disposed on the bearing seat 211, an inner diameter of the bearing 23 is connected to the shaft 212, an outer diameter of the bearing 23 is connected to the rotor 22, and the shaft 212 does not rotate. In one embodiment, the base 21 includes a bearing seat 211 formed on the second structural part 11a, the rotor 22 includes a shaft 212, an outer diameter of the bearing 23 is connected to the bearing seat 211, an inner diameter of the bearing 23 is connected to the shaft 212, and the shaft 212 rotates together with the rotor 22. An appropriate type of the bearing 23 in the embodiments may be selected according to the type of the motor, for example, a ball bearing or an oil-retaining bearing, but it is not limited here. For example, a lube layer having a lubricating effect is disposed between the rotor 22 and the base 21, and the lube layer may be grease, Teflon (Polytetrafluoroethene, PTFE), or other metal plating layer, depending on the different aspects of the bearing 23.

Figure 3:
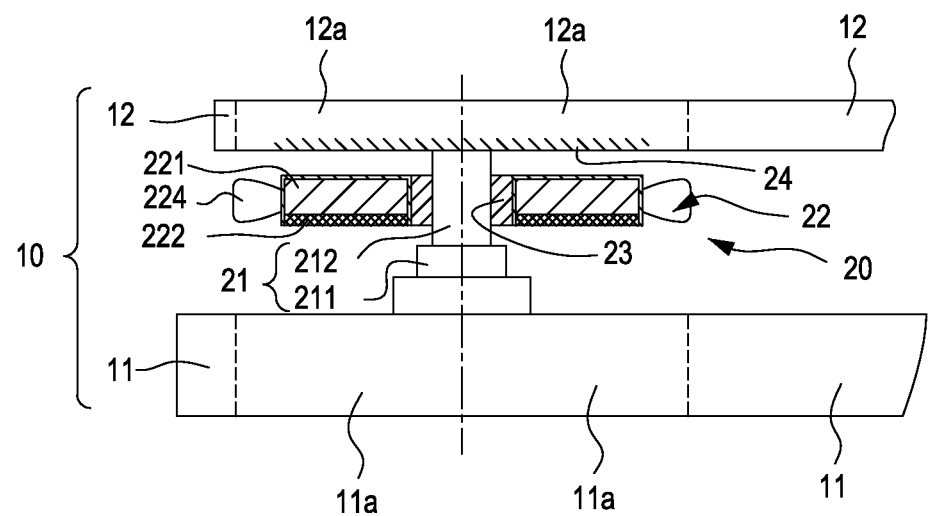
FIG. 3 is a cross-sectional view of a motor according to one embodiment of the present invention, in which a rotor is located between a base and a stator, and a shaft is connected to an electronic substrate.
Figure 4A:
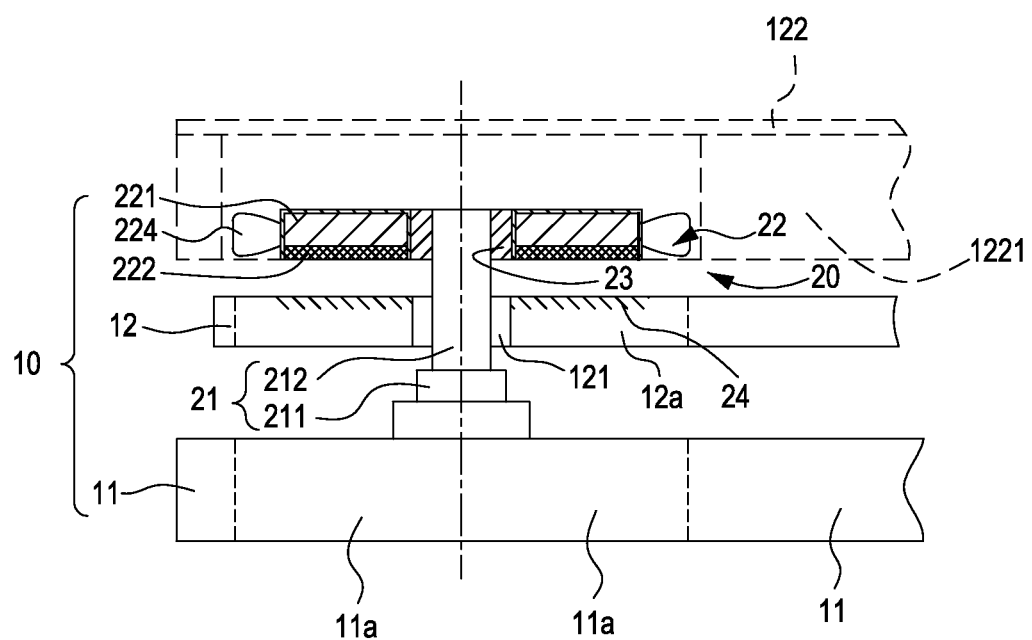
FIG. 4a is a cross-sectional view of a motor according to one embodiment of the present invention, in which a stator is located between a base and a rotor.

According to different configuration structures of the electronic device 10, stacking positions of the rotor 22, the stator 24, and the base 21 may have different changes, for example, the rotor 22 is disposed between the base 21 and the stator 24 (as shown in FIGS. 1 and 2), in this embodiment, one end of the shaft 212 is connected to the bearing seat 211, and the other does not contact with or is connected to the electronic substrate 12, as shown in FIG. 3. FIG. 3 is a cross-sectional view of the motor according to one embodiment of the present invention, in which the rotor is located between the base and the stator, and the shaft is connected to the electronic substrate. In addition, the stator 24 may also be disposed between the base 21 and the rotor 22, and the second electronic substrate 12a has a through hole 121 allowing the shaft 212 of the base 21 to pass through, such that the base 21 is assembled with the rotor 22 through the bearing 23, as shown in FIG. 4a. FIG. 4a is a cross-sectional view of the motor according to the embodiment of the present invention, in which the stator 24 is located between the base 21 and the rotor 22.

Figure 4B:
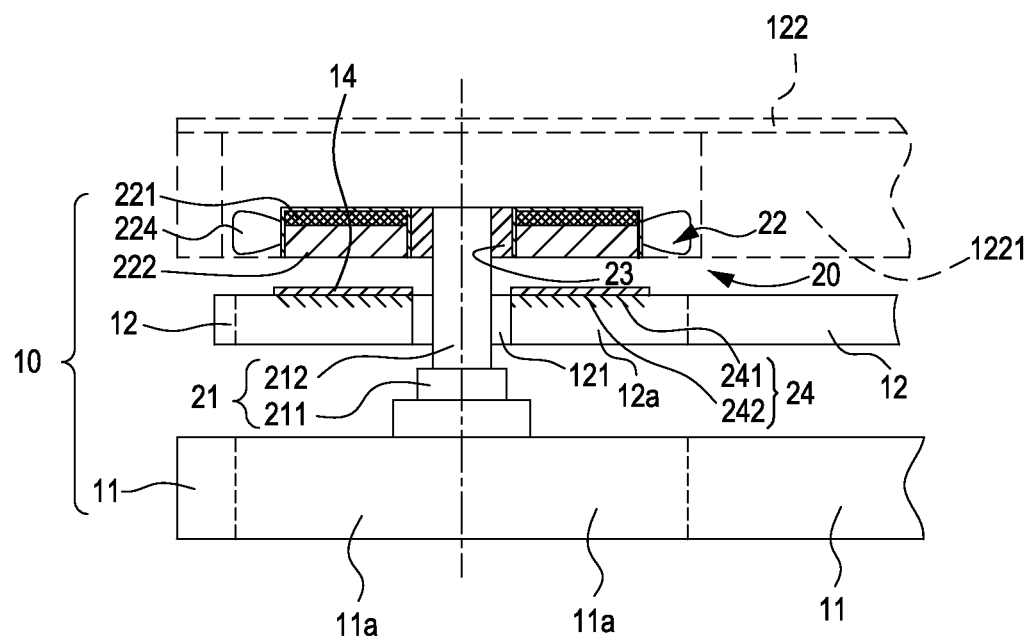
FIG. 4b is a cross-sectional view of a motor according to another embodiment of the present invention, in which a stator is located between a base and a rotor.

Referring to FIG. 4b, in another embodiment, the stator 22 is also located between the base 21 and the rotor 22. The second electronic substrate 12a further includes a protective layer 14 (e.g. solder mask layer) for covering the stator 24, whereby the winding coils 241 and the driving circuit 242 of the stator 24 are directly shaped in the second electronic substrate 12a.

Figure 5A:
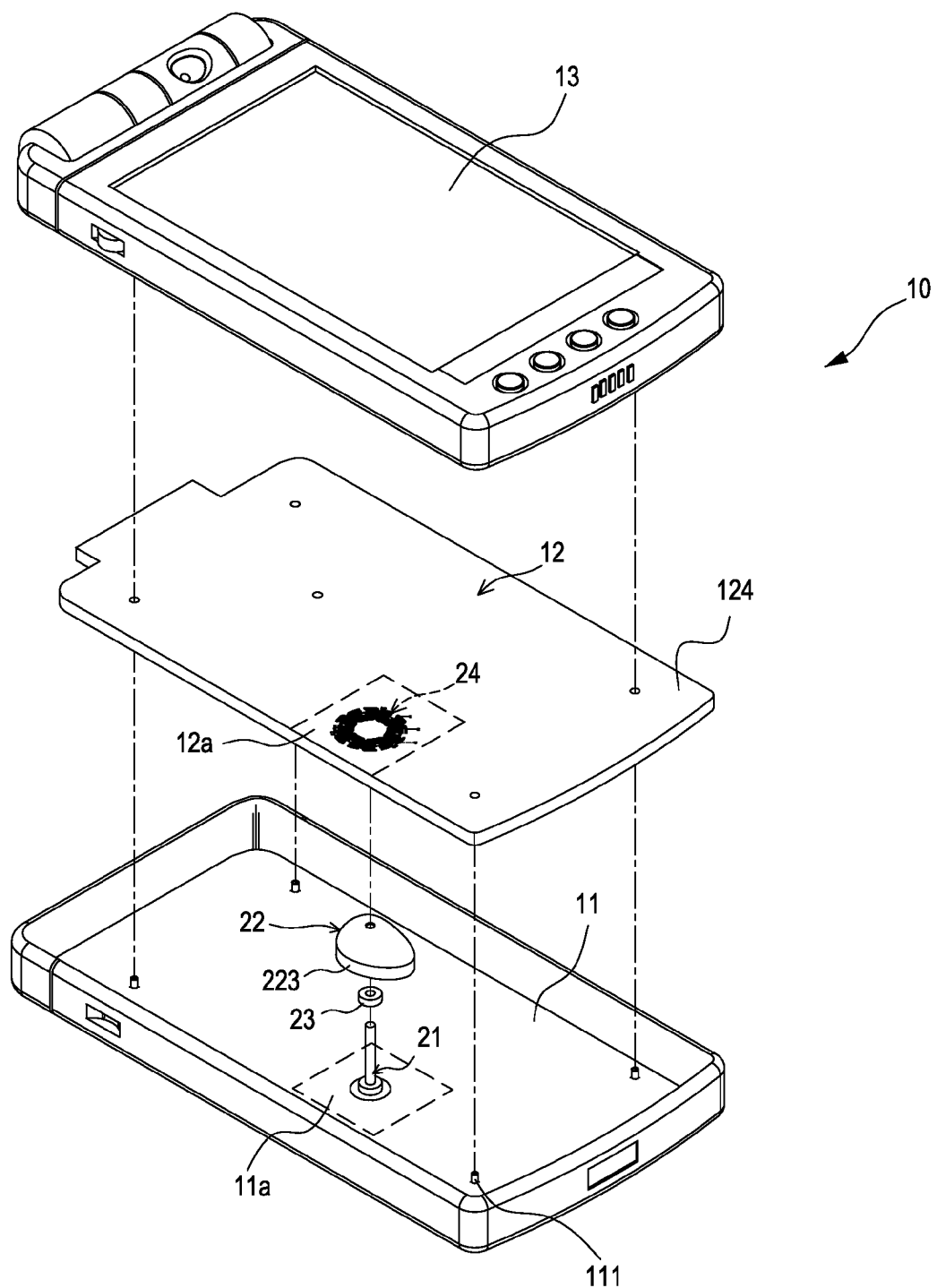
FIG. 5A is a 3D exploded view of a motor according to one embodiment of the present invention, in which the motor is integrated to a cell phone.
Figure 5B:
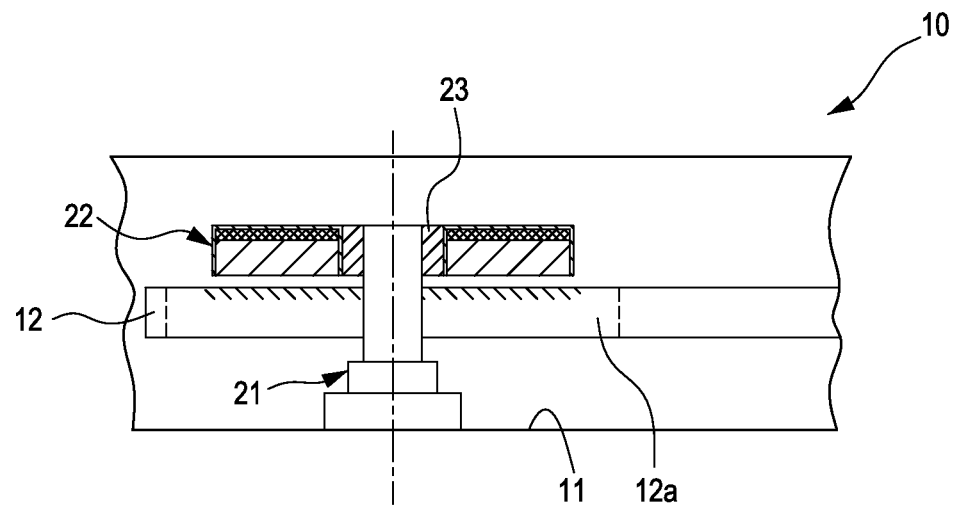
FIG. 5B is a cross-sectional view of a motor according to one embodiment of the present invention, in which the rotor is disposed between a main board and an upper case of the cell phone.
Figure 5C:
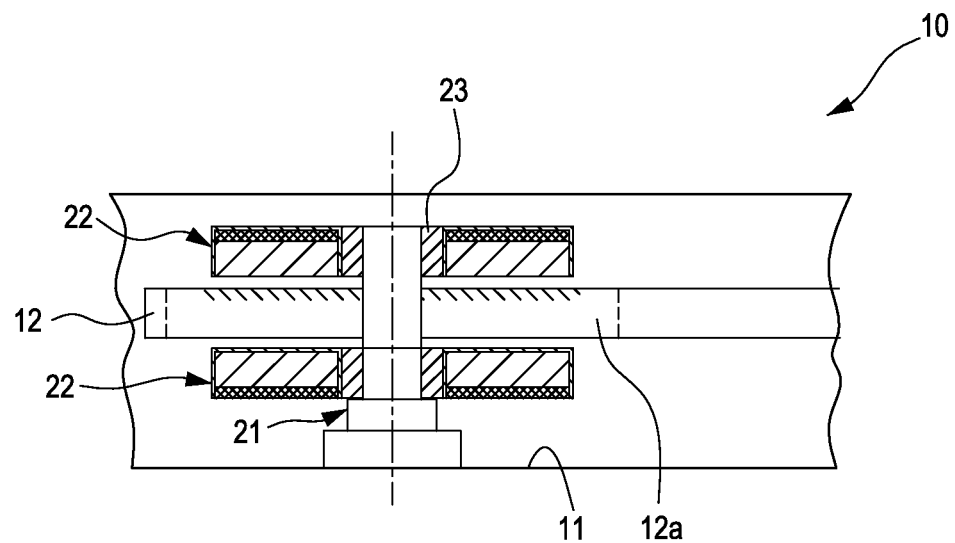
FIG. 5C is a cross-sectional view of a motor according to one embodiment of the present invention, in which one rotor is disposed between a main board and a bottom case of the cell phone and the other rotor is disposed between a main board and an upper case of the cell phone.

Referring to FIG. 5A, a 3D exploded view of the motor according to one embodiment of the present invention is shown, in which the motor is integrated to a cell phone. Particularly, in this embodiment, the motor 20 is integrated to the electronic device 10 of a cell phone. The first structural part 11 is a case, the first electronic substrate 12 is a main board 124, the load of the rotor 22 is an eccentric block 223, and the configuration manner thereof is the same as the type as shown in FIG. 2. The eccentric block 223 is adapted to be a source of vibration of the electronic device 10. In addition, as shown in FIG. 5A, the rotor 22 is disposed between the main board 124 and a bottom case of the cell phone. The rotor 22 may possibly be disposed between the main board 124 and an upper case of the cell phone as shown in FIG. 5B. Moreover, there may have two rotors 22. One rotor is disposed between the main board 124 and a bottom case of the cell phone, and the other one is disposed between the main board 124 and an upper case of the cell phone as shown in FIG. 5C.

Referring to FIG. 5A again, the electronic device 10 further includes a display screen 13, wherein the first structural part 11 is adapted to support the display screen 13.

The first structural part 11 includes a plurality of supports 111 for supporting the first electronic substrate 12, whereby the first electronic substrate 12 can be correspondingly mounted on the first structural par 11.

Figure 6A:
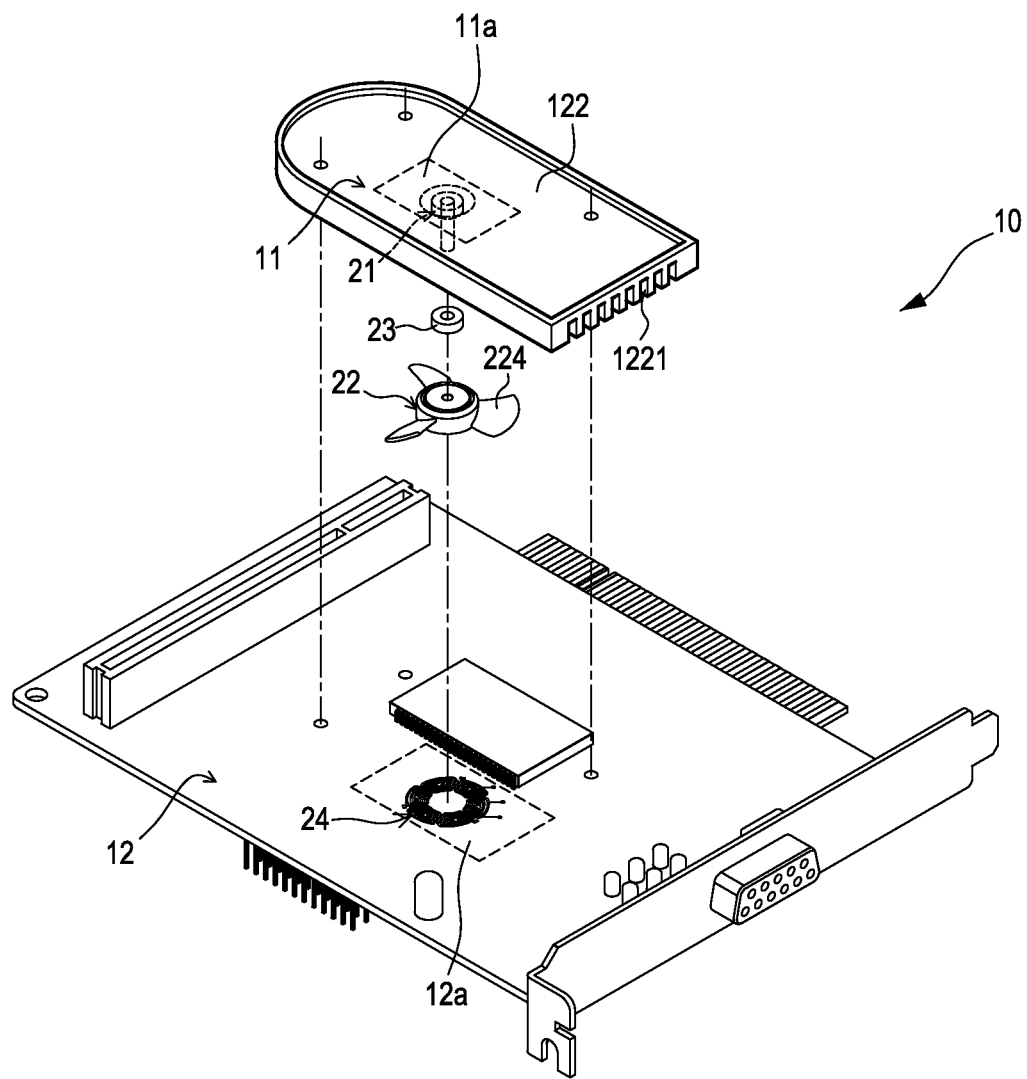
FIG. 6A is a 3D exploded view of a motor according to one embodiment of the present invention, in which the motor is integrated to a display card having a front heat dissipation part.

Referring to FIG. 6A, a 3D exploded view of the motor according to one embodiment of the present invention is shown, in which the motor is integrated to a display card having a front heat dissipation part. In this embodiment, mainly the motor 20 is integrated to the electronic device 10 of a display card. The electronic substrate 12 of the display card has a front side and a back side, and main electronic components are mounted on the front side. A front heat dissipation part 122 is disposed on the front side, and the front heat dissipation part 122 is the first structural part 11 of this embodiment. The base 21 of this embodiment is formed in the front heat dissipation part 122, and the rotor 22 may be completely disposed in the front heat dissipation part 122. The stator 24 of this embodiment is formed on the electronic substrate 12 (that is, the PCBA) of the display card. The configuration manners of the base 21, the rotor 22, and the stator 24 may be obtained with reference to the embodiment of FIG. 2.

Figure 6B:
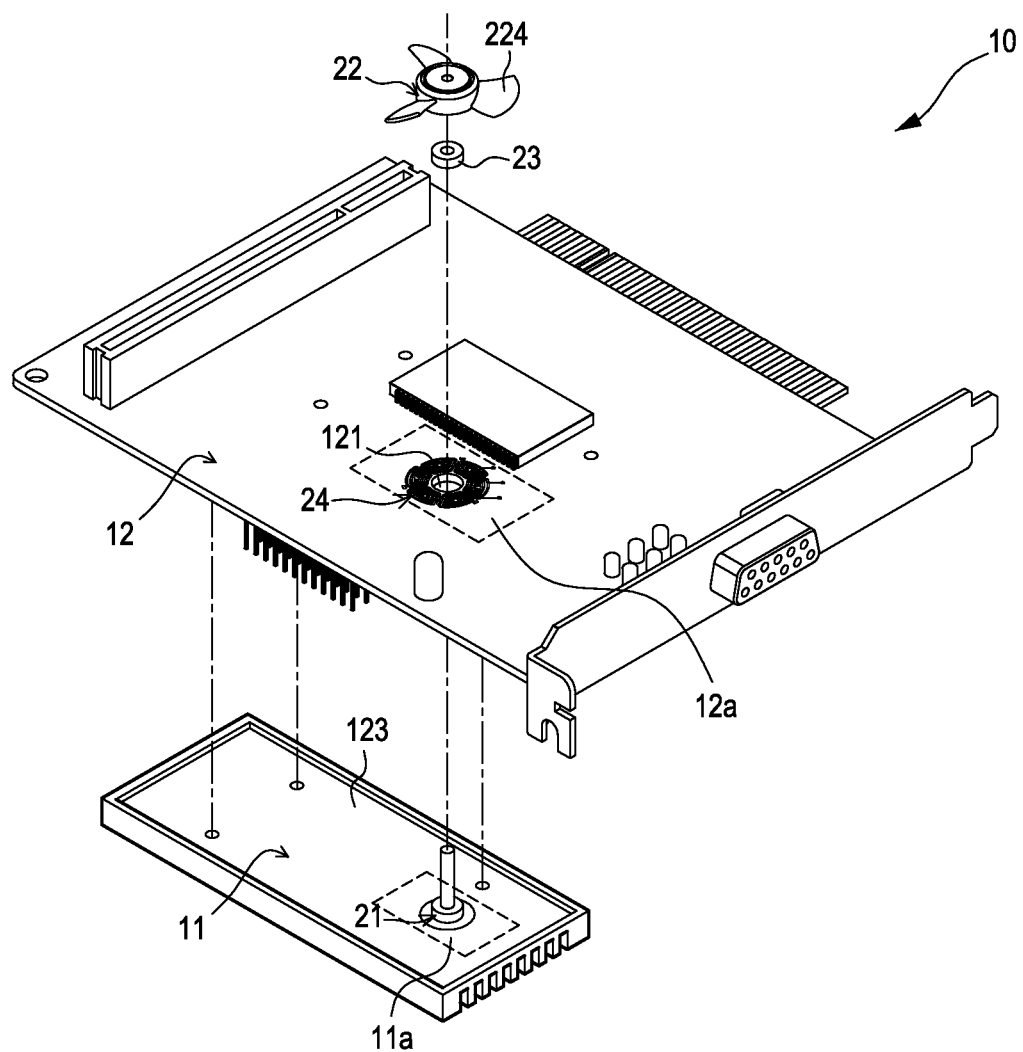
FIG. 6B is a 3D exploded view of a motor according to one embodiment of the present invention, in which the motor is integrated to a display card having a back heat dissipation part.

Referring to FIG. 6B, a 3D exploded view of the motor according to one embodiment of the present invention is shown, in which the motor is integrated to a display card having a back heat dissipation part. In addition, there is another type of the display card in which the back side of the display card has a back plate or a back heat dissipation part 123 disposed thereon. In the embodiment of the present invention corresponding to this type, the base 21 is formed on the back plate or the back heat dissipation part 123, the rotor 22 is located over the front side of the first electronic substrate 12 of the display card, and the stator 24 is still formed on the first electronic substrate 12 of the display card. The configuration manners of the base 21, the rotor 22, and the stator 24 may be obtained with reference to the embodiment of FIG. 4a.

Figure 6C:
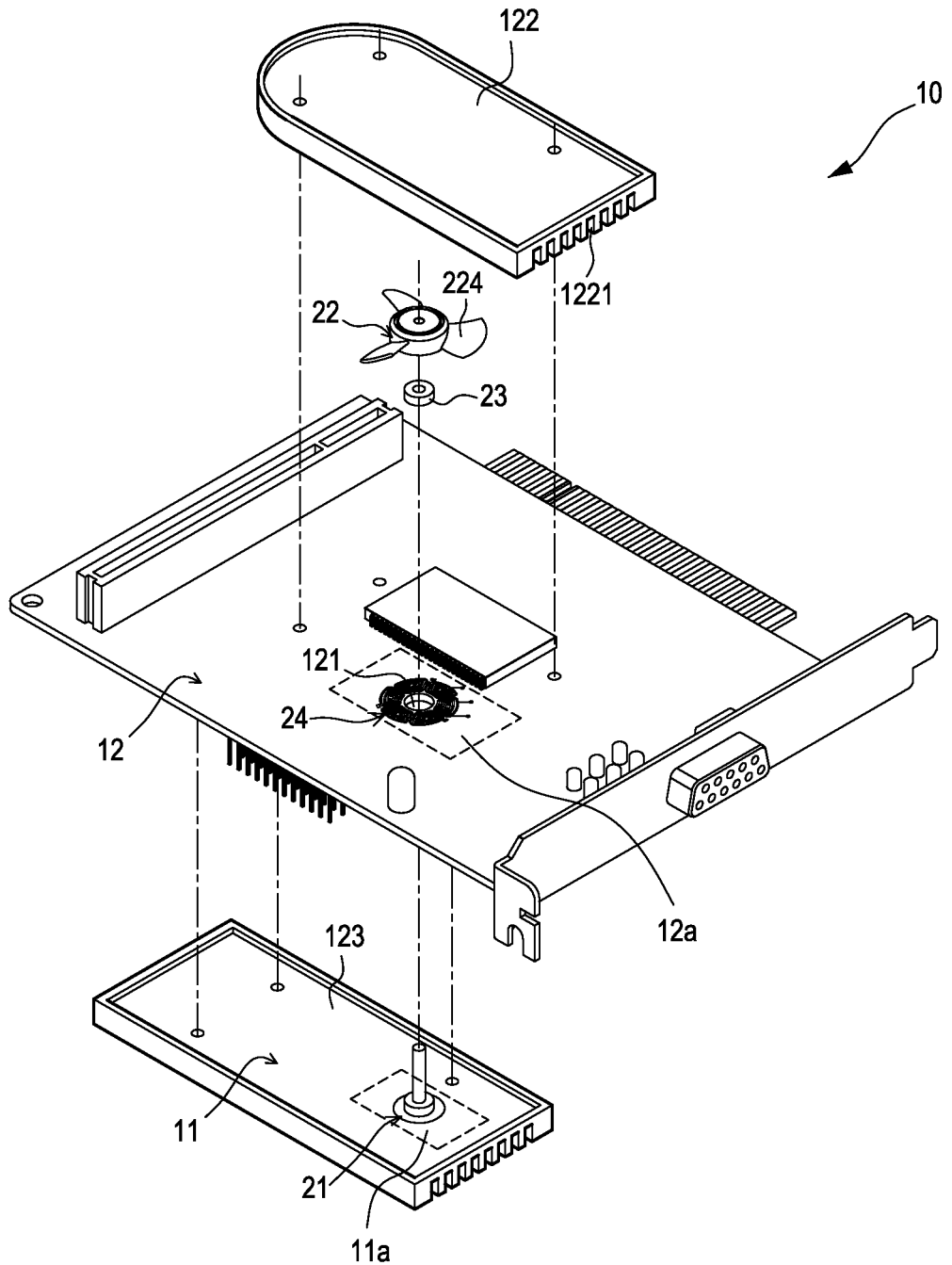
FIG. 6C is a 3D exploded view of a motor according to one embodiment of the present invention, in which the motor is integrated to a display card having a front heat dissipation part and a back heat dissipation part.

Referring to FIG. 6C, a 3D exploded view of the motor according to one embodiment of the present invention is shown, in which the motor is integrated to a display card having a front heat dissipation part and a back heat dissipation part. In the embodiment of FIG. 6C, the front heat dissipation part 122 may be further disposed on the front side of the first electronic substrate 12 of the display card, and the rotor 22 is located in a heat sink 1221 of the front heat dissipation part 122 (referring to FIG. 4a).

Figure 7:
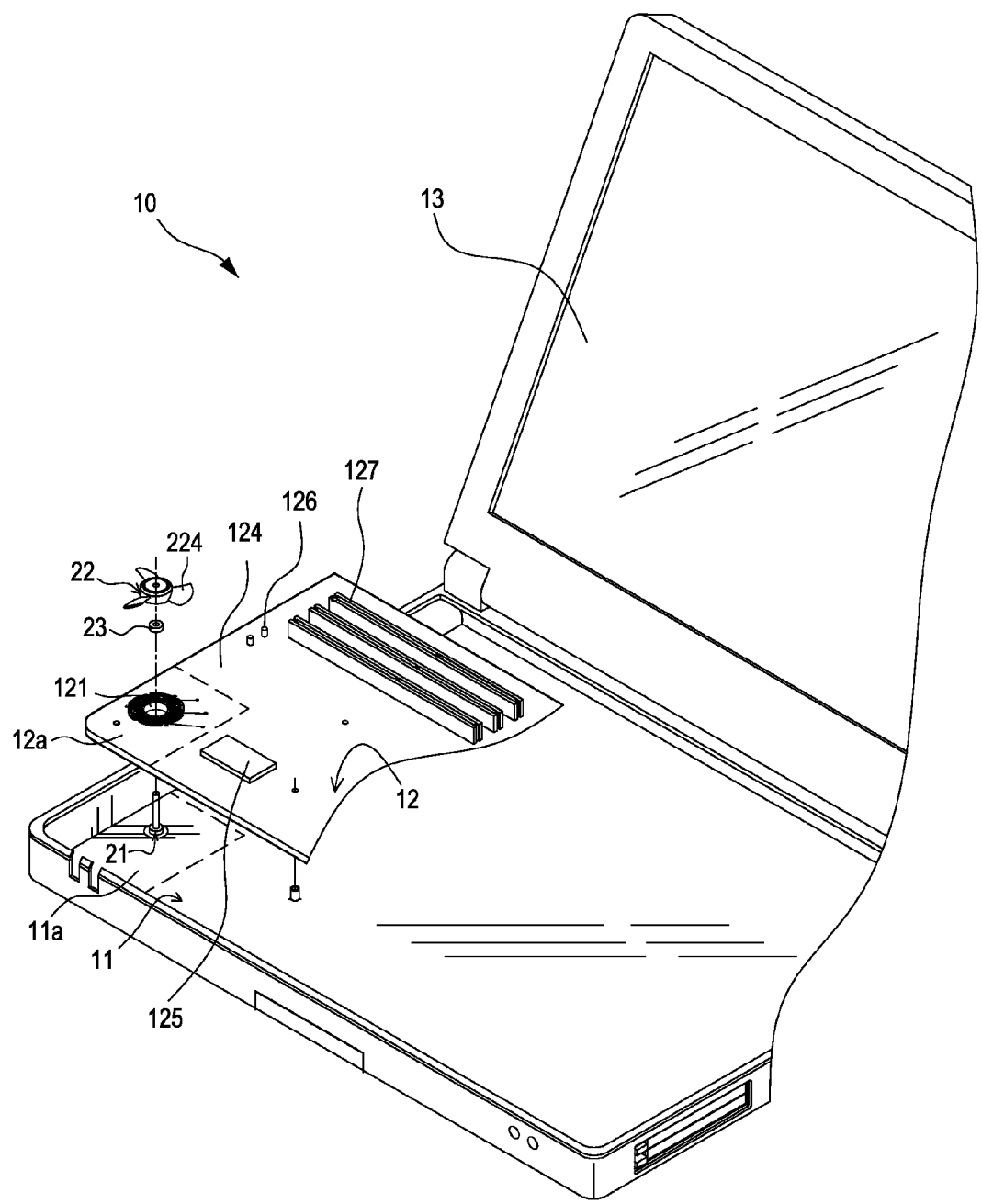
FIG. 7 is a 3D exploded view of a motor according to one embodiment of the present invention, in which the motor is integrated to a notebook computer.

Referring to FIG. 7, a 3D exploded view of the motor according to one embodiment of the present invention is shown, in which the motor is integrated to a notebook computer. Particularly, in this embodiment, the motor 20 is integrated to the electronic device 10 of a notebook computer. The first electronic substrate 12 is a main board 124, the first structural part 11 is a case, and the load of the rotor 22 is a fan blade 224. The fan blade 224 is adapted to be a source of heat dissipation of the electronic device 10. The configuration manners may be obtained with reference to the embodiment of FIG. 4a.

Referring to FIG. 7 again, the electronic device 10 further includes a display screen 13, wherein the first structural part 11 is adapted to support the display screen 13. The first electronic substrate 12 further includes active components 125 (e.g., chins), passive components 126 (e.g., capacitors or inductances), expansion slots 127, etc.

In the present invention, the base of the motor component is directly formed on the first structural part of the electronic device (because the first and second structural parts are combined to a single electronic structural part, and the first and second electronic substrates are combined to a single electronic substrate), such that an entire thickness is thinned. In the present invention, the rotating parts of the motor and the load are integrated to the structure or the case of the existing electronic product, so as to relatively enhance the stability of the structure, reduce the parts, thus facilitating assembling and mass production. In the present invention, the winding and the driving circuit of the stator of the motor are integrated to the circuit board of the electronic product, so as to form a motor module correspondingly with the rotor portion on the electronic product component, such that the manufacture in the same batch is easily performed, the entire cost is reduced, and a thickness and number of the parts of the motor are reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device comprising:
 a first structural part;
 a first electronic substrate correspondingly mounted on the first structural part; and
 a motor comprising:
  a second structural part and a second electronic substrate;
  a base directly formed on the second structural part, wherein the first and second structural parts are integrally made, whereby the first and second structural parts are combined to a single electronic structural part;
  a rotor having at least one load; and
  a stator having a plurality of winding coils and a driving circuit directly shaped on the second electronic substrate respectively for driving the rotor, wherein the first and second electronic substrates are integrally made, whereby the first and second electronic substrates are combined to a single electronic substrate.

2. The electronic device according to claim 1, wherein the driving circuit further comprises a sensing unit.

3. The electronic device according to claim 2, wherein the sensing unit is at least one sensing circuit or at least one Hall element.

4. The electronic device according to claim 1, wherein the rotor comprises a permanent magnet and a yoke disposed corresponding to the permanent magnet.

5. The electronic device according to claim 1, wherein the base comprises a bearing seat formed on the structural part, a shaft and a bearing disposed on the bearing seat, an inner diameter of the bearing is connected to the shaft, and an outer diameter of the bearing is connected to the rotor.

6. The electronic device according to claim 1, wherein the stator is located between the base and the rotor, and the electronic substrate has a through hole allowing the base to assemble with the rotor through a bearing.

7. The electronic device according to claim 6, wherein electronic device is a display card.

8. The electronic device according to claim 1, wherein the load of the rotor is a fan blade adapted to be a source of heat dissipation of the electronic device, or the load of the rotor is an eccentric block adapted to be a source of vibration of the electronic device.

9. The electronic device according to claim 1, wherein the first and second electronic substrates are a printed circuit board (PCB).

10. The electronic device according to claim 1, wherein the first and second electronic substrates are a printed circuit board assembly (PCBA).

11. The electronic device according to claim 1, wherein the structural part is a case of the electronic device.

12. The electronic device according to claim 1, wherein the electronic device is a cell phone, a notebook computer, or a mini notebook computer.

13. An electronic device comprising:
   a first structural part;
   a first electronic substrate correspondingly mounted on the first structural part; and
   a motor comprising:
      a second structural part and a second electronic substrate;
      a base directly formed on the second structural part, wherein the first and second structural parts are integrally made, whereby the first and second structural parts are combined to a single electronic structural part;
      a rotor having at least one load; and
      a stator having a plurality of winding coils and a driving circuit directly shaped in the second electronic substrate respectively for driving the rotor, wherein the first and second electronic substrates are integrally made, whereby the first and second electronic substrates are combined to a single electronic substrate.

14. The electronic device according to claim 13, further includes a display screen, wherein the first structural part is adapted to support the display screen.

* * * * *